Patented Dec. 5, 1944

2,364,358

UNITED STATES PATENT OFFICE 2,364,358

ESTER-LACTONES

Rudolph Leonard Hasche and Jack J. Gordon, Kingsport, Tenn., assignors to Eastman Kodak Company, Rochester, N. Y., a corporation of New Jersey No Drawing. Application August 18, 1943, Serial No. 499,112

10 Claims. (Cl. 260—344)

This invention relates to compounds which are both carboxylic esters and lactones.

It is known that β-(2-furyl)-acrylic acid can be reduced with hydrogen, using palladium black as a catalyst at ordinary temperatures, to yield β-(2-tetrahydrofuryl)-propionic acid (Windaus and Dalmer, Ber. 53, 2306, 1920). Moreover, Kaufmann and Adams (J. Am. Chem. Soc. 45, 3029, 1923) have hydrogenated β-(2-furyl)-acrylic acid, using platinum oxide catalyst at ordinary temperatures, to obtain β-(2-tetrahydrofuryl)-propionic acid. They reported a small amount of a side-reaction product which could not be identified, but which was attributed to opening of the furane ring. Keimatsu, Kate and Fukushima (Journal Pharm. Society of Japan, 50, 6053, 1930) repeated the work of Kaufmann and Adams, and reported in addition to the β-(2-tetrahydrofuryl)-propionic acid, the formation of heptylic acid and heptolactone. Burdick and Adkins (J. Am. Chem. Soc. 56, 438, 1934) hydrogenated ethyl β-(2-furyl)-acrylate using a nickel catalyst on kieselguhr at 120° C. and obtained ethyl-β-(2-tetrahydrofuryl)-propionate. Recently Paul and Hilly (Compt. rendu 208, 359, 1939) hydrogenated β-(2-furyl)-acrylic acid at 100° C. and 70 kilograms pressure, using Raney nickel catalyst. They obtained a 64 percent yield of β-(2-tetrahydrofuryl)-propionic acid and a small amount of gamma heptolactone.

We have now found that upon hydrogenation of β-(2-furyl)-acrylic acid or α-alkyl-β-(2-furyl)-acrylic acids, at temperatures above 200° C., the reaction takes a surprising course with the formation of an ester-lactone. These ester-lactones are new compounds and have very unusual properties. They are extremely heat stable, moderately viscous liquids, having highly lubricating properties and very low vapor pressures. They do not have definite melting points and in this respect resemble organic glasses. They are valuable materials for use as heat transfer media and lubricants. We have found that the ester-lactone made by hydrogenating β-(2-furyl)-acrylic acid is an excellent plasticizer for synthetic rubber. This ester-lactone is insoluble in gasoline. On the other hand, the ester-lactones made by hydrogenating α-ethyl-β-(2-furyl)-acrylic acid is soluble in gasoline. We have found that our new ester-lactones are excellent plasticizers for molding materials made from cellulose esters.

It is, accordingly, an object of our invention to provide new ester-lactones and a process for the preparation thereof. A further object is to provide plasticized compositions comprising such ester-lactones. Other objects will become apparent hereinafter.

In accordance with the invention, we prepare our new ester-lactones by hydrogenating β-(2-furyl)-acrylic acid or α-alkyl-β-(2-furyl)-acrylic acids, at a temperature above 200° C. The temperature employed is advantageously not in excess of 275° C. The probable mechanism for the formation of the ester-lactones can be illustrated by reference to the hydrogenation of β-(2-furyl)-acrylic acid. The initial step in the reaction appears to be the reduction of a portion of the β-(2-furyl)-acrylic acid to β-(2-tetrahydrofuryl)-propionic acid in accordance with the following equation:

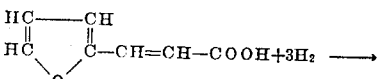

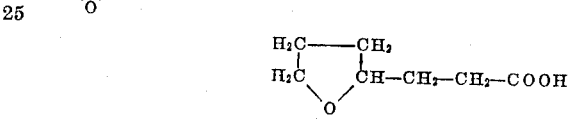

This reaction is one which has predominated in the work reported in the prior art. However, under the conditions of our new process, another portion of the β-(2-furyl)-acrylic acid, at the same time, undergoes cleavage of the furane ring accompanied by hydration and there is formed zeta hydroxy gamma heptolactone as shown by the following equation:

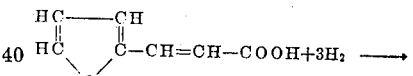

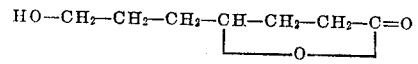

Undoubtedly the acid corresponding to the gamma heptolactone is first produced and then splits out water to form the more stable lactone structure. As a final step in the process, the two intermediate products react to form the ester-lactone in accordance with the following equation:

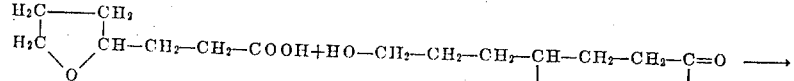

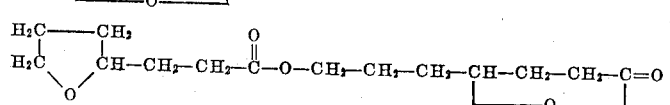

The hydrogenation is carried out under pressure in a closed vessel such as an autoclave. The hydrogenation is advantageously carried out in the presence of a solvent for the starting furyl acrylic acid. Without a solvent the furyl acrylic acid resinifies badly during the process. The organic solvent should be one in which both the starting furyl acrylic acid and the ester-lactone are soluble. We have found that 1.4-dioxane is especially suitable.

Before beginning the hydrogenation, air is advantageously excluded from the closed vessel. Hydrogen is advantageously admitted to the closed vessel under a pressure of from 1000 to 2000 pounds per square inch. As the hydrogen pressure in the vessel drops, owing to hydrogenation, the vessel is recharged with hydrogen gas and this procedure is continued until no more hydrogen is absorbed. During the initial stages of the reaction, hydrogen is absorbed very rapidly, even at very low pressure. However, in order to complete the reaction, it is desirable to raise the pressure above 500 pounds.

The hydrogen is advantageously carried out in the presence of hydrogenation catalyst such as a metallic hydrogenation catalyst, especially nickel hydrogenation catalyst, particularly of the Raney type.

The following examples will serve to illustrate the manner of practicing our invention:

*Example 1.—Hydrogenation of β-(2-furyl)-acrylic acid*

950 grams of β-(2-furyl)-acrylic acid, 1420 millimeters of 1,4-dioxane and 90 grams of moist Raney nickel catalyst were placed together in a rocking autoclave of the type described by Adkins (Adkins, Reactions of Hydrogen, The University of Wisconsin Press, 1937). After purging air from the vessel, hydrogen gas was admitted to the vessel at from 1000 to 2000 pounds per square inch. The autoclave was set in motion and the temperature was elevated to about 210° C. When the hydrogen pressure had dropped to 500 pounds per square inch or less (even to atmospheric pressure) the vessel was recharged with hydrogen gas. This procedure was continued over a period of four or five hours until no more hydrogen was absorbed. The vessel was then allowed to cool and the reaction mixture was decanted from the catalyst which was left in the autoclave for use with a fresh charge of β-(2-furyl)-acrylic acid. The dioxane was removed from the reaction mixture by distillation at reduced pressure (of the order of 50 to 100 mm. of mercury). After removal of the dioxane, the pressure was reduced to 1.5 mm. or less, preferably to 0.1 mm. and distillation of the material was continued. At 1.5 mm. about 35 percent of the product, which remained after removal of the dioxane, was distilled off at a temperature of from 100° C. to 206° C., mostly at about 160° C. The remainder of the product which was the ester-lactone distilled at 206° C. to 207° C. at 1.5 mm. or at 174° C. to 175° C. at 0.15 mm. The ester-lactone was a moderately viscous colorless liquid at ordinary temperatures and pressures.

*Example 2.—Hydrogenation of α-ethyl-β-(2-furyl)-acrylic acid*

950 grams of α-ethyl-β-(2-furyl)-acrylic acid was treated exactly in the same manner as described for β-(2-furyl)-acrylic acid in Example 1. The product obtained in this case was the α-ethyl-β-(2-furyl)-propionate of zeta hydroxy-α-ethyl gamma heptolactone and distilled at 195° C. to 197° C. at 0.15 mm. of mercury pressure.

In a similar manner α-methyl and other α-alkyl-β-(2-furyl)-acrylic acids can be hydrogenated to give ester lactones.

The ester lactone of Example 1 was intimately mixed in varying proportions with cellulose acetate of the type used for molding materials. The following tabulation shows the properties of the resulting plastics:

| | | |
|---|---:|---:|
| Cellulose acetate___parts by weight___ | 100 | 100 |
| Plasticizer _____do____ | 30 | 45 |
| Rockwell hardness _____ | 99.2 | 75.6 |
| Elongation_____per cent__ | 7.4 | 21.7 |
| Tensile strength_____lbs./sq. in__ | 6930 | 4664 |
| Flexural strength _____lbs./sq. in__ | 10200 | 5174 |
| Water absorption___per cent gain__ | 3.37 | 2.88 |
| Loss on heating 7 days___per cent__ | 0.09 | 0.19 |
| Shrinkage _____do____ | 0.03 | 0.34 |

From this tabulation it will be noted that the values for loss on heating and the values for shrinkage are quite low and apparently lower than for any plasticizer applied to cellulose acetate heretofore. Moreover, the other properties of the plastics compare favorably with the plastics made from cellulose acetate and the best known plasticizers.

The ester lactone of Example 1 is a good plasticizer for Koroseal, e. g. 50 parts of the ester lactone for each 100 parts of Koroseal.

What we claim as our invention and desire to be secured by Letters Patent of the United States is:

1. An ester-lactone of the following general formula:

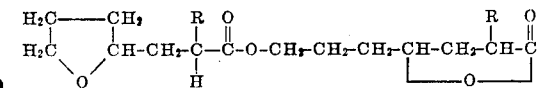

wherein R represents a member selected from the group consisting of hydrogen and alkyl groups.

2. An ester-lactone of the following formula:

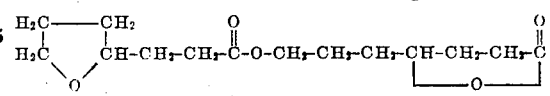

3. An ester-lactone of the following formula:

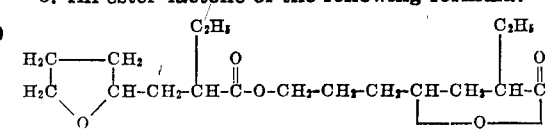

4. A process for preparing an ester-lactone comprising hydrogenating, at a temperature above 200° C., a compound selected from the group consisting of α-alkyl-β-(2-furyl)-acrylic acids and β-(2-furyl)-acrylic acid.

5. A process for preparing an ester-lactone comprising hydrogenating, in a closed vessel, at a temperature above 200° C., a compound selected from the group consisting of α-alkyl-β-(2-furyl)-acrylic acids and β-(2-furyl)-acrylic acid.

6. A process for preparing an ester-lactone comprising hydrogenating, in a closed vessel, in the presence of a hydrogenation catalyst, at a temperature above 200° C., a compound selected from the group consisting of α-alkyl-β-(2-furyl)-acrylic acids and β-(2-furyl)-acrylic acid.

7. A process for preparing an ester-lactone comprising hydrogenating, in a closed vessel, in the presence of a hydrogenation catalyst, at a temperature above 200° C., a compound selected from the group consisting of α-alkyl-β-(2-furyl)- acrylic acids and β-(2-furyl)-acrylic acid, the hydrogenation being carried out in a medium which is a solvent for acrylic acid being hydrogenated.

8. A process for preparing an ester-lactone comprising hydrogenating, in a closed vessel, in the presence of a metallic hydrogenation catalyst, at a temperature above 200° C., a compound selected from the group consisting of α-alkyl-β-(2-furyl)-acrylic acids and β-(2-furyl)-acrylic acid, the hydrogenation being carried out in a medium which is a solvent for acrylic acid being hydrogenated.

9. A process for preparing an ester-lactone comprising hydrogenating, in a closed vessel, in the presence of a nickel hydrogenation catalyst, at a temperature above 200° C., a compound selected from the group consisting of α-alkyl-β-(2-furyl)-acrylic acids and β-(2-furyl)-acrylic acid, the hydrogenation being carried out in a medium which is a solvent for acrylic acid being hydrogenated.

10. A process for preparing an ester-lactone comprising hydrogenating, in a closed vessel, in the presence of a nickel hydrogenation catalyst of the Raney type, at a temperature above 200° C., a compound selected from the group consisting of α-alkyl-β-(2-furyl)-acrylic acids and β-(2-furyl)-acrylic acid, the hydrogenation being carried out in a medium which is a solvent for acrylic acid being hydrogenated.

RUDOLPH LEONARD HASCHE.
JACK J. GORDON.